Aug. 4, 1953                 E. DOUGLASS                2,647,564
TIRE REMOVING APPARATUS WITH CIRCUMFERENTIALLY
DISTRIBUTED THRUST MEMBERS

Filed March 4, 1947                         3 Sheets-Sheet 2

INVENTOR.
ERNEST DOUGLASS
BY
ATTORNEY.

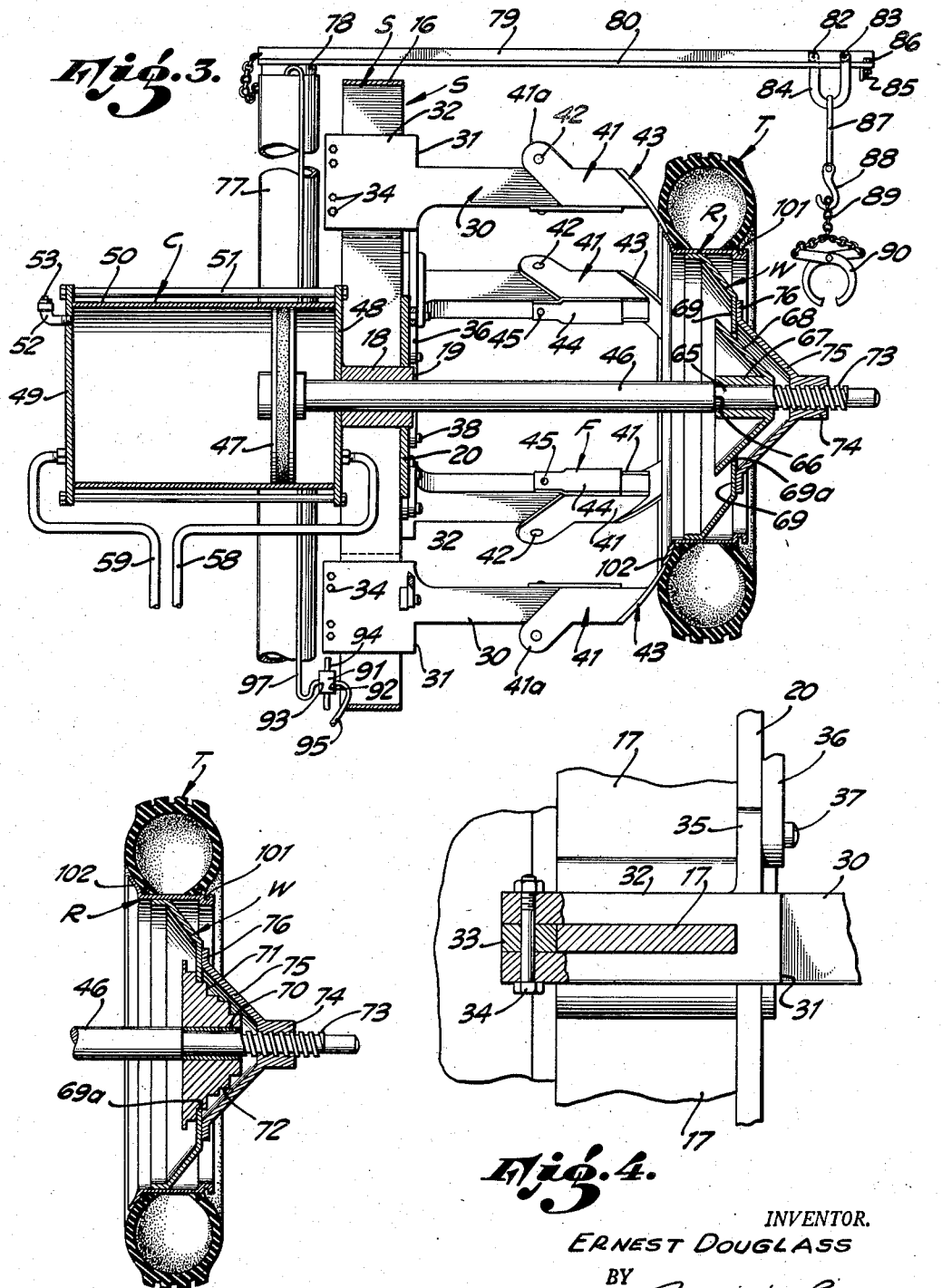

Patented Aug. 4, 1953

2,647,564

UNITED STATES PATENT OFFICE 2,647,564

TIRE REMOVING APPARATUS WITH CIRCUMFERENTIALLY DISTRIBUTED THRUST MEMBERS

Ernest Douglass, Pomona, Calif., assignor to Homer L. Hunsicker, Beverly Hills, Calif.

Application March 4, 1947, Serial No. 732,355

1 Claim. (Cl. 157—1.2)

My invention relates to the field of tire removing mechanisms and more particularly to a hydraulically operated tire removing device adapted for use with tires of industrial sizes.

In providing a mechanism for demounting a pneumatic tire, consideration must be given to the difference existing between the rim used for supporting an industrial tire in contrast to that used on relatively the same size tire in the passenger car tire field. Although in the early development of the pneumatic tire, all tires due to the relatively inflexible character of their carcasses were supported on rims which allowed them to be slidably mounted or demounted therefrom, such is no longer the situation.

On this early type of rim the pneumatic tire was held between a fixed flange and a removable ring which ring due to its resiliency was adapted to remain in place on the rim after having been expanded and forced thereon. With the advent of the low pressure balloon type tire, with its lighter and more flexible type of carcass construction, it was found in the passenger car size that such a tire could be temporarily deformed and forced on a rim having the flanges made integral therewith.

However, this condition does not prevail in the industrial field in which both the balloon and high pressure type tire are still mounted on the early type rim that is provided with a removable ring. This difference in mounting between the passenger and industrial type tire may be easily accounted for when it is considered that in the industrial field a tire must be constructed with a large number of plies to withstand the great loads and shocks to which it will be subjected. Thus, the resulting heavy duty industrial type balloon tire although operated at low pressure is formed with such an inflexible carcass that the beads on same cannot be sprung over the flanges of a rim as is done in a passenger car tire, but must be slidably mounted or demounted from a rim provided with a removable ring.

As my invention operates by slidably removing the tire from the rim it will be apparent that while it has but little application in the passenger car field, it will find wide application in the industrial field for both high pressure and balloon type heavy duty pneumatic tires. In the industrial field my invention will be found particularly useful in the removal of heavy duty tires from such mechanical equipment as trucks, busses, tractors, earth moving machinery, airplanes, and more recently amphibious vehicles as perfected by the armed services such as the "Duck."

A difficulty encountered in using heavy duty pneumatic tires is the removal of the tire from the rim after long usage. This difficulty of removing the tire may be considered as arising from the combined effect of several factors. The first of these factors is the heat generated by the flexing of the plies as the tire is rapidly rotated, and the tendency of the tire to heat up, due to the inability of the heat generated in the interior plies to escape therefrom. The second factor involves the weather conditions to which the tire is subjected, and which includes the passage of the tire through mineral carrying water in various forms such as puddles, flooded areas, slush and the like. A small amount of this water seeps inwardly between the outer face of the bead and the inner face of the rim, and due to the heating action of the tire as it rotates is expelled by evaporation, leaving the mineral content. After a prolonged period of time a mineral deposit is built up between the rim and bead of the tire that acts as a cement in bonding them together, and may require a great force running into tons of pressure to break. It will be readily apparent that unless considerable care is used in removing a tire that is so bonded to its supporting rim, injury to the carcass of the tire will result.

The major object of my invention is to provide a stationary tire demounting mechanism that is adapted for removing heavy duty industrial pneumatic tires from their rims with a minimum of expense, time, and manual effort.

Another object of my invention is to furnish a device that while quickly and efficiently removing a tire from its supporting rim will protect the carcass thereof from the injury that happens so frequently when rubber hammers are employed for this purpose.

These and other objects and advantages of my invention will appear from the following description of a preferred form therof, and from the accompanying drawings wherein:

Figure 3 is an enlarged longitudinal cross sectional view of the hydraulically operated portion of my tire demounting mechanism taken on the line 3—3 in Figure 2;

Figure 4 is an enlarged cross sectional view of the pressure finger support taken on the line 4—4 in Figure 2; and Figure 5 is an alternate form of the centering cone used in securing correct alignment of the pneumatic tire supporting wheel prior to demounting the tire therefrom.

Figure 1:
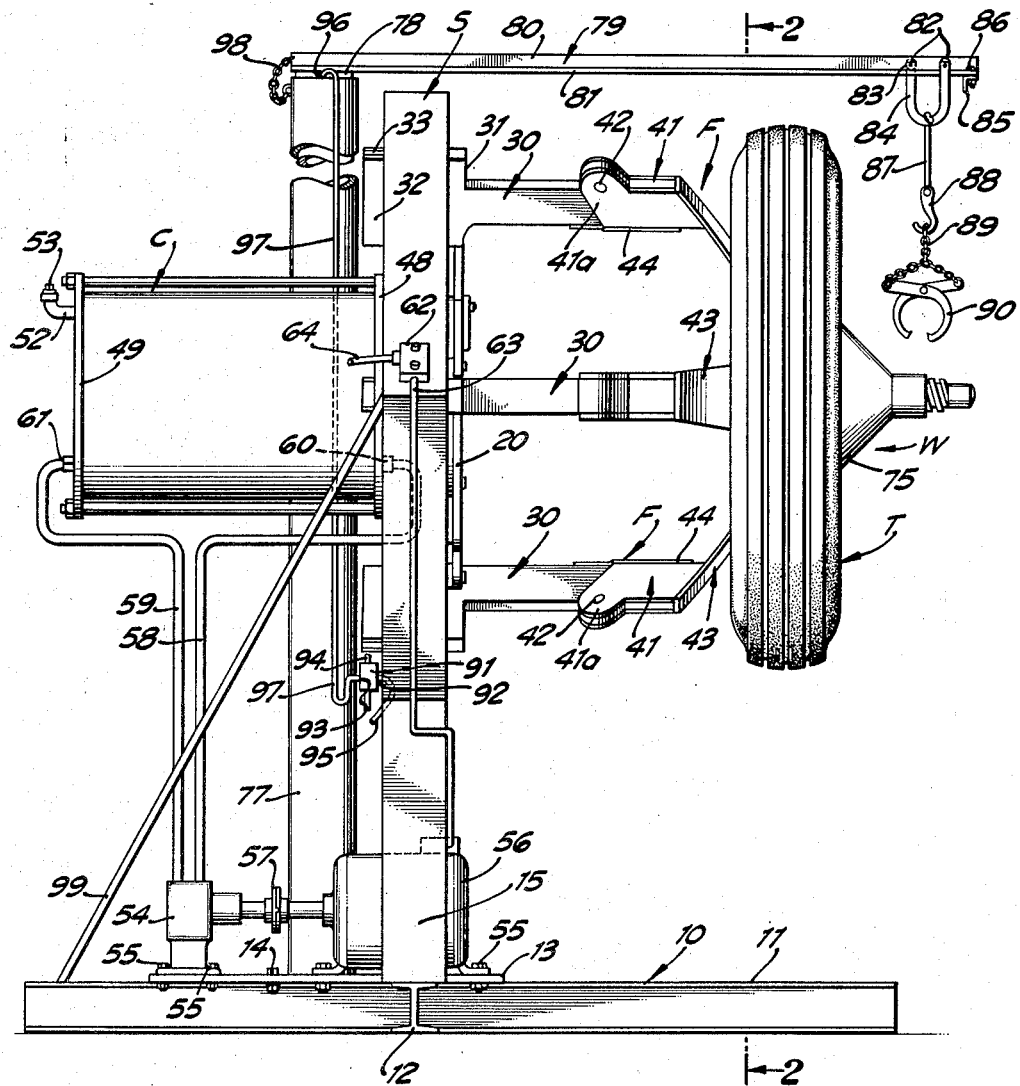
Figure 1 is a side elevation of my pneumatic tire demounting mechanism.
Figure 2:
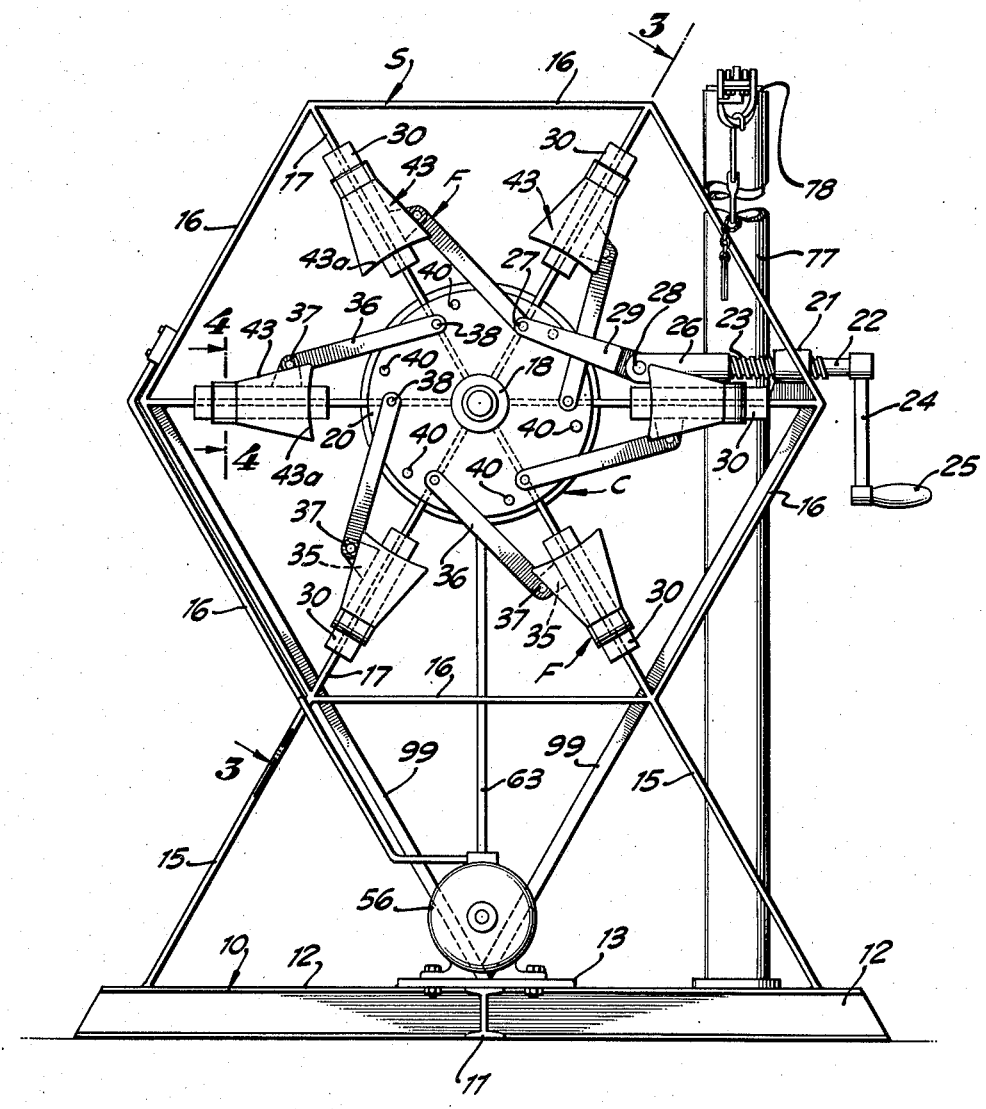
Figure 2 is a front elevational view of the same device taken on the line 2—2 in Figure 1.

Referring now to the drawings, and particularly to Figures 1, 2 and 3 thereof for the general arrangement of my invention it will be seen that mounted in a vertical position is a hexagonally shaped spider S, with six radially movable outwardly extending pressure fingers F supported therefrom, and which may be concurrently adjusted to a position adapted for removing a pneumatic tire T from a rim R, when the rim supporting wheel W is moved inwardly by a hydraulic cylinder C.

For supporting my invention I provide a base frame or floor sill 10 in the form of a symmetrical cross that includes cross arms 11 and 12 respectively. It will be apparent that as the arms 11 and 12 are in the same horizontal plane, the arm 11 may be continuous with the arm 12 being formed from two pieces of metallic material that are welded or otherwise secured to the arm 11 at the point of intersection. Although any heavy rigid material may be used for the base frame 10, I have found it convenient to use commercially available I-beams of the desired cross section for both the arms 11 and 12. Extending forwardly over the cross arm 12 a few inches, and rearwardly along the cross arm 11 a substantial distance, is a rectangular base plate 13 that is preferably fabricated from steel plate of from one-half to three-quarter inches in thickness. To secure the base plate 13 to the frame 10 a number of machine bolts 14 are provided, and engage suitably disposed openings located in both the base plate and the upper flanges of the arms 11 and 12. The purpose of the base 13 is to support the equipment used in actuating the hydraulic cylinder C, and which will hereinafter be discussed in detail.

To support the spider S in a vertical position a pair of supporting legs 15 are provided, with each leg being preferably formed from heavy steel bars of rectangular cross section, and extending downwardly and outwardly from the lower exterior surface of the spider to the cross arm 12. As the spider S when once placed in position need not again be moved, I have found it desirable to weld or otherwise permanently affix the legs 15 to both the spider S and cross arm 12.

The spider S is fabricated as a unit by welding six relatively heavy steel bars of equal length that constitute the side members 16, into the desired hexagon shaped figure. Disposed at the center of the spider S is a horizontally positioned cylindrical spider hub 18, that is firmly held in position by six outwardly extending diagonal members 17 of rectangular bar steel. The inwardly extending end of each diagonal member 17 is affixed by welding to the exterior surface of the spider hub 18 and the outwardly extending end to the interior face of the spider S at the junction point of each of the side members 16. The width of the side members 16 and the length of the hub 18 are identical, but the width of each diagonal member 17 is somewhat less. Therefore as the rearwardly disposed edge of each diagonal member 17 is flush with the rearward surface of both the hub 18 and the side members 16, a cylindrical mounting is provided by the forwardly disposed portion 19 of the hub and serves as a rotatable support for a circular cam plate 20.

To provide a mechanism suitable for rotating the cam plate 20, a journal box 21 of conventional design is situated near the outer end of one of the horizontal diagonal members 17, and is welded or otherwise permanently affixed to the spider S. Rotatably supported in the journal box 21 is a substantially horizontal shaft 22 that is provided on its inwardly extending portion with threads 23. A crank 24 affixed to the outwardly extending end of the shaft 22, and provided with a suitable handle 25, permits the shaft 22 to be manually rotated. For translating the rotational movement of the crank 24 into lateral motion suitable for rotating the cam plate 20, a cylindrical internally threaded member 26 is furnished which engages the threaded portion 23 of the shaft. Pivotally joined to the cam plate 20 by a machine bolt 27 that engages a suitable opening provided therein, and on the opposite end by a pin 28 to the inwardly disposed end of the internally threaded member 26, is a connecting link 29 of conventional design. Thus as the shaft 22 is rotated by the crank 24, the member 26 and the connecting link 29 are moved laterally and the cam plate 20 rotated, the importance of which will become apparent from a further reading of the specification.

Supporting each of the pressure fingers F used in slidably removing the tire T from the rim R is a forwardly extending, substantially horizontal, pressure arm 30 of rectangular cross section which is slidably mounted on one of the diagonal members 17 by means of a U-shaped member 31. Each of the U-shaped members 31, as best seen in Figures 3 and 4, includes a pair of laterally spaced rectangular arms 32 that embrace one of the diagonal members 17 and extend rearwardly a short distance therebeyond. Engaging openings provided in this rearwardly extending portion of the arms 32, and similar openings provided in a rectangular spacer bar 33 of rigid material inserted therebetween, are a number of machine bolts 34. Thus, by tightening the machine bolts 34 and using a spacing bar 33 of the proper thickness, the desired degree of frictional resistance may be secured between the diagonal member 17 and the U-shaped member 31. In addition, by removing the machine bolts 34 and the spacing bar 33, the pressure arm 30 may be removed and replaced by another arm should the occasion so require.

To permit concurrent radial movement of the pressure arms 30 as a group, due to rotating the shaft 22 with the crank 24, a lug 35 that extends inwardly toward the hub 18 is situated on each of the U-shaped members 31, and with its forwardly disposed face in vertical alignment with the forward face of the cam plate 20. An inwardly extending link 36 is movably supported and held on the forward face of each lug 35 by a pin 37 that engages suitable openings provided in both members. The inner portion of each link 36 is movably joined to the cam plate 20 by a machine bolt 38 that may be placed in either of two openings 39 or 40, that are provided for each link on the cam 20. It will be noted in Figure 2 that the openings 39 and 40 are equally spaced on concentric bolt circles, with the bolt circle for the openings 40 being larger than that used for the openings 39. When the machine bolts 38 are changed from the openings 39 to the openings 40 a greater throw of each of the links 36 is obtained, and with a consequent more rapid and further outward movement of the pressure arms 30. For convenience in changing the machine bolts 38 from one of the openings 39 or 40 to the other, I have found it desirable to have the openings so arranged on their respective bolt circles that they are grouped together in pairs as may best be seen in Figure 2. Although the machine bolts 38 are normally situated in the cam plate openings 39, in the case of exceptionally large tires where the maximum radial movement of the fingers F is required the openings 40 are employed.

Each of the pressure fingers F used in slidably removing the tire T from the rim R includes a trapezoid shaped plate 41 having a rearwardly and outwardly extending arm 41a. A pair of the plates 41 are disposed on opposite sides of the forwardly extending portion of the pressure arm 30 and are pivotally supported thereon by a hinge pin 42 that engages a suitable opening provided in each arm 41a and in an extension (not shown) of the pressure arm 30. Extending inwardly toward one another, and affixed to the forward end of each pair of plates 41 is a tapered or wedge shaped steel pressure plate 43 of from one-eighth to one-quarter inch in thickness. It will be noted in Figure 2 that the widest portion of each of the pressure plates 43 is the inwardly disposed edge 43a, which is preferably ground or formed somewhat concave in order that it will approximately fit the exterior surface of the various sized rims that will be encountered. As my invention will be used for removing tires of various sizes, the curvature of the edge 43a must necessarily be such that it will fit all sizes of rims for which my device is adapted, rather than an exact fit for one particular size. Since the tire T is first contacted by the forwardly extending edge 43a of each pressure plate 43, and which is situated considerably inward from the hinge pin 42, the pressure finger F will pivot inwardly as pressure is applied to the tire T until further movement is prevented by the edge 43a contacting the exterior surface of the rim R.

For holding the pressure fingers F in substantially a horizontal position prior to the pressure plates 43 engaging the side walls of the tire T, a leaf spring 44 is provided for each pressure arm 30 and extends longitudinally along the inner side thereof with its forward portion extending under and supporting the pair of trapezoid shaped plates 41. Due to the resiliency of the spring 44 the pressure finger F is returned to a position substantially in alignment with the pressure arm 30 upon the pressure plate 43 being removed from contact with the sidewalls of the tire T. In addition as pressure is applied to the tire T each of the springs 44 is bent inwardly and with the result that each pressure plate 43 exerts the same pressure on the tire T as the balance of the plates when the tire T is removed uniformly from the rim on which it is mounted. For convenience in the assembly of my invention I affix the spring 44 to the inner side of the pressure arm 30 by a cap screw 45 that engages internally tapped openings formed in both members. By loosening the cap screw 45 and extracting the pin 42 the pressure finger assembly F may be removed from the pressure arm 30 for repairs or replacement should the occasion so require.

To permit the tire T to be moved rearwardly toward the pressure fingers F for removal from the rim R, a rod 46 of circular cross section is slidably mounted in a horizontal position within the bore of the spider hub 18. Rigidly affixed to the rearwardly disposed extremity of the rod 46, and situated on the side of the spider S opposite the pressure arms 30, is a circular piston head 47 of conventional design that is slidably enclosed in the hydraulic cylinder C. The hydraulic cylinder C includes a pair of piston heads 48 and 49, with a cylindrical shell 50 formed of high tensile steel, supported therebetween. A number of stud bolts 51 engage openings provided in both of the cylinder heads 48 and 49, and serve to hold the hydraulic cylinder C together as a unit. For holding the hydraulic cylinder C in the desired horizontal position, the cylinder head 48 is welded or otherwise secured in a conventional manner to the rearward side of the diagonal members 17 of the spider S as best seen in Figure 3. In order that the hydraulic cylinder C may be filled with hydraulic fluid from time to time to replace that which may be lost after long usage in my device, an upwardly extending L-shaped conduit 52 is situated near the top of the cylinder head 49, and is supplied with a removable filling plug 53.

Hydraulic fluid under pressure for actuating the piston 47 is supplied by a hydraulic pump 54 that is situated on the base 13 and held in position thereon by a number of machine bolts 55 that engage openings provided in both the base and pump. An electric motor 56, adapted for use with the ordinary 110 volt electric power supply normally found in the type of garage or building in which a tire demounting mechanism such as mine would be installed, is similarly bolted to the base 13 and connected to the motor 54 by a coupling 57. Extending upwardly from the hydraulic pump 54 to the hydraulic cylinder C are a pair of conduits 58 and 59, with the upper end of conduit 58 being affixed to a suitable fluid connection 60 disposed on the cylinder head 48, and the conduit 59 being likewise connected to a similar fitting 61 situated on the cylinder head 49. Either of the conduits 58 or 59 may act as discharge or suction for the hydraulic pump 54, depending upon its direction of rotation.

An electrical reversing switch 62 of conventional design is situated at a convenient location on the spider S, and electrically connected to the motor 56 by a pair of insulated conductors 63. A pair of insulated conductors 64 extends from the switch 62 to the 110 volt electric power supply. The motor 56 may now be operated in either direction with the result that the pump 54 can discharge hydraulic fluid into either of the conduits 58 or 59. Upon hydraulic fluid being discharged through one of the conduits 58 or 59 by the pump 54, an equal quantity of fluid is withdrawn from the hydraulic cylinder C through the opposite conduit which is then acting as the pump suction. Thus, by controlling the direction of rotation of the pump 54 with the electrical reversing switch 62, the piston head 47 and the rod 46 attached thereto may be moved either rearwardly or forwardly at the will of the operator. It will be apparent from an examination of Figure 3 that a cushion of hydraulic fluid exists at all times on each side of the cylinder contained piston 47 and prevents any horizontal movement of same, except when the pump 54 is operating.

Situated at the forwardly disposed end of the rod 46 is a portion 65 of reduced diameter that forms an annular shoulder 66 with the rearward portion 46 of the rod. Slidably mounted on the rod portion 46 is an annular collar 67, with a truncated, hollow, centering cone 68 extending rearwardly from its forwardly disposed edge with an increasing larger diameter, as best seen in Figure 3. In the manufacture of my device I have found it desirable to have the centering cone 68 and the annular ring 67 cast from steel as an integral unit. It will be noted that the distance which the centering cone 68 may move rearwardly on the shaft portion 65 is limited by the annular shoulder 66 contacting the rearward face of the collar 67.

As the normal industrial wheel W is formed with a solid metallic web 69 that extends inwardly from the rim R to a centrally disposed opening 69a, which is provided in the web in order that the shaft of a vehicle may pass therethrough, this same opening 69a may be employed for centering the wheel W on my invention by inserting the truncated portion of the centering cone 68 therein. The wheel W is then moved rearwardly toward the spider S until the increasing diameter of the centering cone 68 contacts the outer circumference of the opening 69a and prevents further rearward movement. The tire T on the wheel W is now perfectly aligned with relation both to the rod 46 and the pressure fingers F prior to having the tire T removed as may best be seen in Figure 3.

As an alternate form of the above described centering cone 68, and one that functions equally well, a device such as shown in Figure 5 may be substituted. An annular collar 70, adapted for being slidably mounted on the shaft portion 65, has four outwardly extending plates 71 affixed thereto at an angle of substantially 90 degrees to one another. Each of the plates 71 is roughly triangular in form, and is provided along its outwardly disposed hypotenuse with a series of steps 72, as may best be seen in Figure 5. Each of the steps 72 is in vertical alignment with similar steps provided on the other plates 71, and thus forms a horizontal support for the wheel W when its centrally disposed opening 69a is placed thereon. It will be apparent that as the steps 72 are graduated upwardly and rearwardly to correspond with the diameter of the openings 69a provided on wheels W of various sizes, that this device operates in much the same manner as the centering cone 68. However the alternate form of the centering cone does have the advantage that when the wheel W is placed on the steps 72, it remains in place, and has no tendency to slide forwardly as is the situation when the wheel W is placed on the centering cone 68.

For retaining the wheel W in place on either the centering cone 68 or the steps 72, the forwardly disposed section of the shaft portion 65 is provided with threads 73 that are adapted to engage an internally threaded collar 74. Extending rearwardly from the collar 74 with an increasing larger diameter is a hollow pressure cone 75 that terminates at its base periphery in a substantially vertical flange 76. Thus, upon rotating the collar 74 the pressure cone 75 is moved rearwardly and the wheel W whether mounted on the centering cone 68 or the steps 72 is firmly held in position thereon by the vertical flange 76 engaging the forwardly disposed surface of the wheel flange 69 as shown in Figure 3. It will be noted that the pressure cone 68 is substantially enveloped by the centering cone 75 when the latter is holding a wheel W in place thereon.

To facilitate lifting a pneumatic tire carrying wheel W into place on the centering cone 68 with a minimum of effort, a vertically disposed air cylinder 77 is mounted in a convenient location on the base 13 and may be welded, bolted, or otherwise secured thereto. Telescopically mounted in the cylinder 77 is an inverted air cylinder 78 of somewhat greater height than the cylinder 77. Rigidly supported from the top of the air cylinder 78 is a substantially horizontal boom 79 that is preferably formed from an inverted T-beam having a vertical web 80 and a horizontal flange 81. The boom 79 extends forwardly to a position somewhat beyond the wheel W when it is mounted on the pressure cone 68 or the steps 72 as may best be seen in Figures 1 and 3.

A pair of anti-friction rollers 82, each rotatable along the boom flange 81 but situated on opposite sides of the web 80, support a downwardly extending, inverted, U-shaped traveler 84 from horizontal outwardly extending shafts 83, that may be affixed to the traveler in any convenient manner. A downturned angle iron member 85 affixed to the forwardly disposed end of the boom 79 by machine bolts 86 prevents the traveler 84 from being inadvertently displaced therefrom. Extending downwardly from the traveler 84 is a lift cable 87 which serves to support a conventional grab hook 88. Suspended from the grab hook 88 is a tong bridle 89 that engages a pair of lift tongs 90, as may best be seen in Figures 1, 2 and 3.

In order that the tongs 90 may be utilized for lifting a wheel W from the floor to a position on the centering cone 68, the boom 79 is moved upwardly by applying air under pressure to the space enclosed by the cylinders 77 and 78. For controlling the flow of air to the cylinders 77 and 78, a conventional three position air valve 91, with an air inlet port 92, a combination air inlet and outlet port 93, and an outlet port 94 which is vented to the atmosphere, is located at an easily accessible position on the spider S.

A conduit 95 that may be either flexible or rigid, extends from the air valve port 92 to a source of air under pressure that will normally be found available in a garage or building such as my invention would be situated in. Extending upwardly from the air valve port 93 to a suitable air fitting 96 situated on the upper portion of the air cylinder 78 is a flexible hose 97 with considerable slack provided therein. It will be apparent from Figure 1 that the amount of slack required in the hose 97 will be that required to allow the air cylinder 78 to move upwardly to its maximum operating height.

To move the boom 79 upwardly the air valve 91 is rotated from its first or normally closed position to its second position wherein the ports 92 and 93 are in communication with one another. The air is then forced through the hose 97 into the space enclosed by the air cylinders 77 and 78, and as the air pressure is built up therein the cylinder 78 and the boom 79 are moved upwardly. When the desired height has been attained by the boom 79, the air valve 91 is returned to its first position, and with the result that the boom will remain in a stationary position due to the inability of the air to escape from the cylinders 77 and 78. In lowering the boom 79 the air valve 91 is rotated to the third position in which the inlet port 92 remains closed but communication is established between the ports 93 and 94. As the cylinder contained air escapes to the atmosphere through the port 94 the weight of the boom 79 forces the air cylinder 78 downwardly until its lower edge is resting on the base of the air cylinder 77. In order that the boom 79 may be restrained from rising above a certain pre-determined maximum height, as well as to prevent the cylinder 78 from being accidentally displaced from the cylinder 77, a chain 98 is connected to both the boom 79 and the air cylinder 77 as best seen in Figure 1.

Although the chain 98 has been found quite satisfactory in restraining the upward movement of the boom 79, it will be apparent that a member may be connected between the boom 79 and the air valve 91 so that when the boom has reached a certain maximum height the air supply to the cylinders 77 and 78 will be automatically cut off.

For reinforcing the spider frame S against any sudden shocks which may be incurred in the operation of my invention, I provide a pair of reinforcing bars 99, with each bar extending rearwardly from the outer extremity of each horizontal diagonal member 17 to a position on the cross arm 11, as best seen in Figure 1.

In the operation of my invention the wheel W is laid upon the floor and the pneumatic tire T mounted thereon is deflated to substantially atmospheric pressure. A demountable steel ring (not shown) which due to its resiliency is held in a groove 101 situated on the outer edge of the rim R is then removed. The tire T is now in a position to be slidably removed from the rim R, but due to the reasons previously mentioned in detail this can seldom be accomplished without exercising great manual effort.

The boom 79 which may not only be raised vertically but rotated in a horizontal plane is now swung into a convenient location, the traveler 84 run out to a position above the wheel W, and the lift tongs 90 affixed to the tire T mounted thereon. Air valve 91 is now placed in a position to permit air to flow through the hose 97 into the air cylinders 77 and 78, and with the result that the cylinder 78, the boom 79, and the wheel W are moved upwardly.

Upon the shaft 46 and the center of the opening 69a coming into substantially horizontal alignment, the valve 91 is rotated to the closed position to prevent further upward movement of the boom 79. The shaft portion 65 is inserted into the wheel opening 69a, and the wheel W moved rearwardly until further movement is made impossible by the centering cone 68 fully occupying the opening 69a. With the wheel W held in this position from the tongs 90, the collar 74 is caused to engage the shaft threads 73, and then rotated to move the pressure cone 75 rearwardly. Upon the flange 76 of the pressure cone 75 contacting the forwardly disposed face of the wheel web 69, the wheel W is firmly held in position on the centering cone 68, and the boom 79 is no longer required. The boom 79 may now be swung into a position in which the lift tongs 90 will not interfere with the work of removing the tire T. The air valve 91 is rotated to the third position that allows the cylinder contained air to escape from the valve port 94 to the atmosphere, and permits the air cylinder 78 and the boom 79 to move downwardly into their initial position. For the most efficient operation of my invention I have found it desirable to be concurrently deflating a number of tires T, and placing one of them on the lift tongs 90, during the time that another tire T is being removed from its wheel W on my invention.

With the wheel W in position on the centering cone 68 the crank 24 is rotated, and the internally threaded member 26 moves inwardly or outwardly dependent upon the direction of the crank rotation. Due to the link 29 movably connecting the member 26 and the circular cam plate 20, the lateral movement of the member 26 caused by the rotation of the crank 24, results in rotation of the cam 20. As the cam plate 20 is rotated a concurrent radial movement of the pressure arms 30 takes place due to the displacement of the connecting links 36 as may best be seen in Figure 2. Each of the links 36 is adjustable both as to its throw and the speed of its inward or outward radial movement, which is dependent on whether it is pivoted to the cam 20 in opening 39 or 40. While normally the links 36 will be pivoted to the cam plate 20 in the openings 39, if a tire of unusual size is encountered the links may be moved out to engage the openings 40 which will increase the outward radial movement of the pressure arms 30.

By rotating the crank 24 the pressure arms 30 are moved to a position in which the edge 43a of the pressure fingers F will just clear the outer periphery of a rearwardly disposed flange 102 on the rim R, as best seen in Figure 3. The electrical switch 62 is now placed in a position which will cause the motor driven pump 54 to rotate in a direction that will force hydraulic fluid through the conduit 58 into the right hand side of the hydraulic cylinder C as may best be seen in Figures 1 and 3. When hydraulic fluid is forced into the cylinder C, the piston head 47 and the rod 46 attached thereto are moved rearwardly, and the wheel W being rigidly affixed to the rod 46 between the centering cone 68 and the pressure cone 75 is likewise moved rearwardly, with the sidewalls of the tire T engaging the tapered pressure plates 43.

As the wheel W and the tire T move rearwardly, the pressure fingers F being pivotally mounted above the line of pressure are rotated inwardly with the edge 43a of the pressure plate being forced between the flange 102 and the bead of the tire. The downward rotation of the pressure fingers F will continue until the edge 43a of each of the pressure plates 43 contacts the exterior surface of the rim R, whereupon the tire T begins to be slidably demounted. Due to each of the pressure fingers F being provided with a leaf spring 44 that tends to force the pressure plate 43 forwardly and upwardly each pressure plate exerts the same force upon the tire T as the balance of the pressure plates when the tire T is removed uniformly from the rim on which it is mounted. However, upon a portion of the tire T adhering to the rim on which it is mounted, the lower downwardly extending portion of the pressure member 43 which is in contact with the adhering portion of the tire is bent rearwardly to place a gradually increasing pressure on the tire. After the lower portion of the member 43 being bent rearwardly a certain distance, sufficient pressure is exerted on the tire due to the rearward movement thereof to break the adhering tire portion loose. Upon the adhering tire portion being broken loose the member 43 due to the resiliency thereof pushes the tire forwardly into substantially the same vertical plane as the balance of the members and tire. As the springs 44 tend to oppose the fingers F pivoting inwardly, the fingers after contacting the tire are kept in contact therewith until the tire is displaced from the rim. The wheel W is moved rearwardly on my invention until the tire T is slidably removed from the rim R, and at which point the pressure fingers F are forced upwardly into substantial alignment with the pressure arms 30 by the resiliency of the leaf springs 44. The pressure fingers F are thus out of the path of the flange 102, when the wheel W is moved forwardly to the position it occupied prior to having the tire T removed therefrom. The forward movement of the wheel W is achieved by reversing the electrical switch 62 and changing the direction of rotation of the motor 56. As the pump 54 is revolved in the opposite direction hydraulic fluid is forced through the conduit 59, and withdrawn from the cylinder C through the conduit 58, thus forcing the piston head 47 forwardly and returning the centering cone 68 and pressure cone 75 to their position for removing the wheel W.

While the particular apparatus herein shown and described is fully capable of attaining the objects and providing the advantages hereinbefore stated, it is to be understood that it is merely illustrative of the presently preferred form of my invention, and that I do not mean to limit myself to the details of construction or design herein shown, other than defined in the appended claim.

I claim:

A tire demounting apparatus which includes: a supporting frame having a plurality of radial members extending outwardly from a central axis; means for supporting a flanged rim with a tire thereon and moving the same along said axis toward said frame; a pressure arm slidably mounted on each of said radial members for movement therealong, said arms extending longitudinally of said axis and spaced therefrom; means for adjusting the radial position of said pressure arms; a relatively short pressure shoe pivotally mounted on the outer end portion of each of said pressure arms, each of said shoes being formed of spaced parallel plates having rearwardly and outwardly extending portions at one of their ends with a pivot pin extending therebetween and engaging said pressure arm, each of said shoes having a relatively short flat pressure plate thereon joining the free ends of said parallel plates and extending angularly inwardly from the outward edges of said parallel plates whereby to engage a tire being advanced toward said frame and to be forced inwardly between the bead of said tire and the flange of said rim, said pressure plates being of sufficient rigidity and strength to force said tire from said rim as the rim continues to move toward said frame; and spring means engaging the inward edges of the parallel plates of each of said pressure shoes and urging them outwardly to a position longitudinal of said frame axis.

ERNEST DOUGLASS.

References Cited in the file of this patent

UNITED STATES PATENTS

| Number | Name | Date |
|---|---|---|
| 1,399,351 | Lee | Dec. 6, 1921 |
| 1,724,813 | Weaver et al. | Aug. 13, 1929 |
| 1,742,590 | Freivogel | Jan. 7, 1930 |
| 1,959,655 | Brouhard | May 22, 1934 |
| 2,075,421 | Bennett | Mar. 30, 1937 |
| 2,201,982 | Bazarek | May 28, 1940 |
| 2,270,657 | Kraft | Jan. 20, 1942 |
| 2,373,975 | Plumeau et al. | Apr. 17, 1945 |
| 2,508,520 | Johnson | May 23, 1950 |
| 2,536,139 | Ritter | Jan. 2, 1951 |
| 2,545,157 | McCrary | Mar. 13, 1951 |

FOREIGN PATENTS

| Number | Country | Date |
|---|---|---|
| 395,406 | Germany | May 19, 1924 |